(No Model.)

W. M. LINDSEY.
COTTON PLANTER.

No. 288,077.  Patented Nov. 6, 1883.

WITNESSES:
Geo Berger
C. Sedgwick

INVENTOR:
W. M. Lindsey
BY Munn & Co
ATTORNEYS.

UNITED STATES PATENT OFFICE.

WILLIAM M. LINDSEY, OF OAKWOOD, TEXAS, ASSIGNOR TO HIMSELF AND BENJAMIN B. KIMBALL, OF SAME PLACE.

COTTON-PLANTER.

SPECIFICATION forming part of Letters Patent No. 288,077, dated November 6, 1883.

Application filed June 5, 1883. (No model.)

*To all whom it may concern:*

Be it known that I, WILLIAM M. LINDSEY, of Oakwood, in the county of Leon and State of Texas, have invented a new and Improved Cotton-Planter, of which the following is a full, clear, and exact description.

The invention will first be described in connection with the drawings, and then pointed out in the claims.

Reference is to be had to the accompanying drawings, forming a part of this specification, in which similar letters of reference indicate corresponding parts in all the figures.

Figure 1:
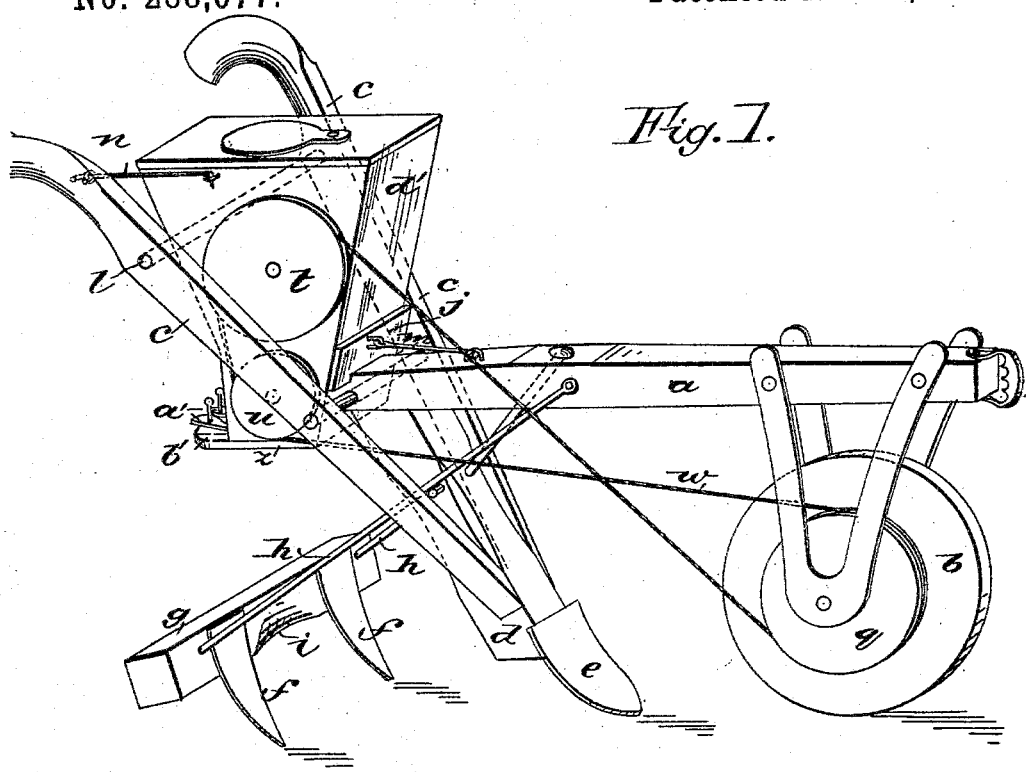
Figure 2:
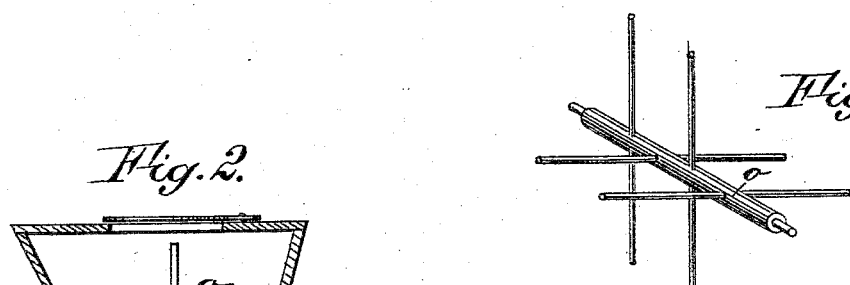
Figure 3:
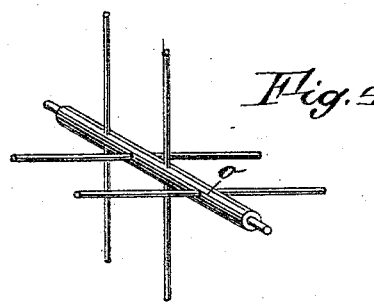
Figure 4:
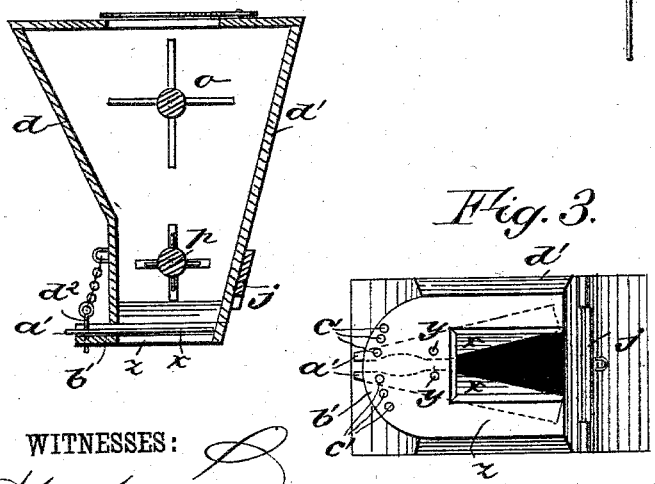
Figure 5:
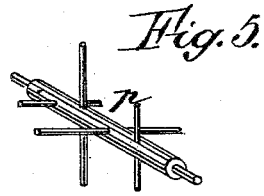

Figure 1 is a perspective view of my improved cotton-seed planter. Fig. 2 is a sectional elevation of the seed-hopper. Fig. 3 is a plan view of the bottom of the hopper; and Figs. 4 and 5 are perspective views of agitating-reels that I employ to prevent the seed from clogging in the hopper.

A beam, $a$, is used with a wheel, $b$, at the front, and a plow-stock or foot, $d$, and handles $c$ at the rear end of the beam, the stock having a drill or furrow-opening plow, $e$, and behind there are two covering-plows, $f$, attached to a bar, $g$, that is connected to the beam $a$ by rods $h$ suitably arranged to draw said plows, which run along each side of the furrow and throw the earth back into it; and the beam $g$ has a wide notch, $i$, cut in the front lower edge between plows $f$, by which notch the ridge of earth thrown up by them is gathered under the beam $g$, and pressed and smoothed down by it to pack the earth lightly on the seed.

I construct the seed-hopper $d'$ in suitable dimensions to rest on the rear end of the beam $a$ by the notched cleat $j$, with the back resting against the cross-bar $l$ connecting the handles, between which the hopper also fits. It is fastened in this position by the hooks $m$ $n$ and suitable eye-studs or staples, so that it can be readily taken off when the plow may be required for other purposes.

Inside of the hopper I arrange two reels, $o$ and $p$, one above the other, for stirring the seed in both the upper and lower parts, to effectually prevent the seed from clogging, and gear the reels with the pulley $q$ on the plow-wheel $b$ by the pulleys $t$ $u$, over both of which passes an endless cord, $w$, which is crossed between these pulleys and pulley $q$ for better adhesion on all of the pulleys.

To regulate the dropping of the seed I have a couple of gates, $x$, pivoted at $y$ over the bottom plate, $z$, having the opening through which the seed falls, so as to close said opening more or less by turning on said pivots, for which said gates have arms $a'$ extending out over an extension, $b'$, of the bottom plate, $z$, having a series of holes, $c'$, by which to fasten the gates at any position by pins $d^2$.

Having thus described my invention, I claim as new and desire to secure by Letters Patent—

1. The combination, with the rear of beam $a$, of the notched cleat $j$, the handle cross-bar $l$, and the hooks $m$ $n$, whereby the hopper may be conveniently attached and detached, as described.

2. The pivoted gates $x$ $x$, having extensions $a'$ with a series of holes, with the hopper-bottom plate $z$, having holes $c'$ besides the regular seed-outlet, and the pins $d^2$, as shown and described.

WILLIAM M. LINDSEY.

Witnesses:
S. BACON,
FRANK ARNETT.